US008414102B2

(12) United States Patent
Viturro et al.

(10) Patent No.: US 8,414,102 B2
(45) Date of Patent: Apr. 9, 2013

(54) IN SITU CALIBRATION OF MULTIPLE PRINTHEADS TO REFERENCE INK TARGETS

(75) Inventors: R. Enrique Viturro, Rochester, NY (US); Yeqing Zhang, Penfield, NY (US); Patricia J. Donaldson, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 34 days.

(21) Appl. No.: 13/208,272

(22) Filed: Aug. 11, 2011

(65) Prior Publication Data

US 2013/0038657 A1 Feb. 14, 2013

(51) Int. Cl.
*B41J 29/393* (2006.01)
*B41J 2/175* (2006.01)
*B41J 2/01* (2006.01)
*G01D 11/00* (2006.01)

(52) U.S. Cl. ............... 347/19; 347/88; 347/99; 347/104

(58) Field of Classification Search ........................ None
See application file for complete search history.

(56) References Cited

U.S. PATENT DOCUMENTS

| | | | | |
|---|---|---|---|---|
| 5,343,231 | A | 8/1994 | Suzuki | |
| 5,519,419 | A | 5/1996 | Stephany et al. | |
| 5,724,259 | A | 3/1998 | Seymour et al. | |
| 6,147,698 | A | 11/2000 | Zable et al. | |
| 6,312,078 | B1 | 11/2001 | Wen | |
| 6,318,831 | B1 | 11/2001 | Baker | |
| 6,775,029 | B1 | 8/2004 | Wen et al. | |
| 6,832,824 | B1 | 12/2004 | Baker et al. | |
| 7,008,036 | B2 | 3/2006 | Ju et al. | |
| 7,123,850 | B1 | 10/2006 | Hamby et al. | |
| 7,364,274 | B2 | 4/2008 | Kawabata et al. | |
| 7,393,072 | B2 | 7/2008 | Lim et al. | |
| 7,556,337 | B2 | 7/2009 | Snyder | |
| 7,585,044 | B2 | 9/2009 | Williams et al. | |
| 7,712,854 | B2 | 5/2010 | Ou et al. | |
| 7,760,397 | B2 | 7/2010 | Hosier | |
| 7,766,447 | B2 | 8/2010 | Snyder et al. | |
| 7,854,490 | B2 * | 12/2010 | Snyder | 347/19 |
| 8,075,084 | B2 * | 12/2011 | Ossman et al. | 347/19 |
| 2004/0090482 | A1 | 5/2004 | Lapstun et al. | |
| 2005/0073697 | A1 | 4/2005 | Silverbrook et al. | |
| 2008/0278531 | A1 | 11/2008 | Ikeda et al. | |
| 2010/0259573 | A1 * | 10/2010 | Viturro et al. | 347/9 |
| 2011/0063359 | A1 * | 3/2011 | Buchar et al. | 347/19 |

* cited by examiner

*Primary Examiner* — Geoffrey Mruk
(74) *Attorney, Agent, or Firm* — Maginot, Moore & Beck, LLP

(57) ABSTRACT

A method for calibrating in situ a plurality of printheads in an imaging device has been developed. Firing signals operate a plurality of printheads to form ink test patterns on an image receiving member. Reflectance measurements of light reflected from the test patterns and optical density measurements for a portion of the patterns formed by only one printhead in the plurality of printheads are used to adjust the firing signals and enable the printheads to print within a predetermined range about an average reflectance value and a predetermined optical density.

5 Claims, 6 Drawing Sheets

IN SITU CALIBRATION OF MULTIPLE PRINTHEADS TO REFERENCE INK TARGETS

TECHNICAL FIELD

This disclosure relates generally to calibrations of printheads in an imaging device, such as an inkjet printer having one or more printheads, and, more particularly, to adjustments to the operation of ink ejectors in the one or more printheads to produce images with uniform optical densities.

BACKGROUND

Inkjet printers have printheads that operate a plurality of inkjets to eject liquid ink onto an image receiving member. The ink may be stored in reservoirs located within cartridges installed in the printer. Various forms of ink include aqueous, oil, solvent-based, UV curable inks, or ink emulsions. Other inkjet printers receive ink in a solid form and then melt the solid ink to generate liquid ink for ejection onto the imaging member. In these solid ink printers, the solid ink may be pellets, ink sticks, granules, pastilles, or other forms. The solid ink pellets or ink sticks are typically placed in an ink loader and delivered through a feed chute or channel to a melting device that melts the ink. The melted ink is then collected in a reservoir and supplied to one or more printheads through a conduit or the like. In other inkjet printers, ink may be supplied in a gel form. The gel is also heated to a predetermined temperature to alter the viscosity of the ink so the ink is suitable for ejection by a printhead.

A typical full width inkjet printer uses one or more printheads. Each printhead typically contains an array of individual nozzles for ejecting drops of ink across an open gap to an image receiving member to form an image. The image receiving member may be a continuous web of recording media, a series of media sheets, or the image receiving member may be a rotating surface, such as a print drum or endless belt. Images printed on a rotating surface are later transferred to recording media by mechanical force generated in a transfix nip that is formed by the rotating surface and a transfix roller. In an inkjet printhead, individual piezoelectric, thermal, or acoustic actuators generate mechanical forces that expel ink from a pressure chamber through an orifice in response to an electrical signal, also referred to as a firing signal. The amplitudes, or voltage levels, of the signals affect the amount of ink ejected in each drop. The firing signal is generated by a printhead controller in accordance with image data. An inkjet printer forms a printed image in accordance with the image data by printing a pattern of individual ink drops at particular locations on the image receiving member. The locations where the ink drops landed are sometimes called “ink drop locations,” “ink drop positions,” or “pixels.” Thus, a printing operation can be viewed as the placement of ink drops on an image receiving member in accordance with image data.

In order for the colors of printed images to correspond closely to the image data, the ink drops ejected onto the media for each ink color should form uniform colors for a given density of the color as specified in the image data. For example, if a region of a media sheet includes a region where 50% of the surface of the sheet should be covered in yellow ink, then the resulting ink image should appear to have a uniform yellow color in the specified region. To achieve the uniform color, the average sizes and masses of individual ink drops that form the ink image should be substantially uniform. In practical embodiments, the ink ejectors in an individual printhead may eject ink drops of various sizes leading to non-uniform colors in the ink images. Additionally, variances in the drop masses of ink drops ejected by different printheads also result in undesirable non-uniformity in color reproduction. One example of artifacts that occur in printed images where the drop masses of different printheads are not uniform are “lawn mower tracks.” This term refers to streaks of color from one printhead that appear to be darker than streaks of color from another printhead. To reduce or eliminate the image artifacts, the ejectors in each printhead and multiple printheads are calibrated to enable the printheads to eject ink drops with uniform masses.

Existing techniques for calibrating printheads to eject ink drops with uniform masses are carried out in an offline manner, such as during the manufacturing process of the printhead or in a specially configured calibration device. The offline calibration process is time consuming and requires that printheads be removed from an imaging device to undergo the calibration procedure. During printing operations, the drop mass of ink drops ejected by a printhead may change due to changes in the operational parameters of the printhead caused by use of the printhead over time. The printhead must then be removed from the imaging device for another calibration process. A procedure for calibrating the printheads in situ where one or more printheads are calibrated to eject ink drops with uniform masses while the printheads are operatively configured in the imaging device would be beneficial.

SUMMARY

In one embodiment, a method for calibrating printheads in an imaging device has been developed. The method includes operating a plurality of printheads in the imaging device with a first plurality of electrical signals, each electrical signal in the first plurality of electrical signals operating only one printhead to eject ink drops onto an image receiving member to enable each printhead in the plurality of printheads to produce a portion of a first test pattern on the image receiving member, identifying a first reflectance measurement of light for each printhead in the plurality of printheads with reference to the portion of the first test pattern produced by each printhead, identifying an average for the first reflectance measurements, identifying a difference between each first reflectance measurement and the average for the first reflectance measurements, and adjusting a first portion of each electrical signal in the first plurality of electrical signals used to operate each printhead in the plurality of printheads having an identified first reflectance measurement that is outside a predetermined range about the average of the first reflectance measurements.

In another embodiment, a method for calibrating printheads in an imaging device has been developed. That method includes operating one printhead in a plurality of printheads in the imaging device with an electrical signal to eject ink drops onto an image receiving member to enable the one printhead in the plurality of printheads to produce a portion of a first test pattern on the image receiving member, spreading the first test pattern on the image receiving member, identifying a first reflectance measurement for the one printhead with reference to the portion of the first test pattern produced by the one printhead, the first reflectance measurement corresponding to an optical density of the ink ejected by the one printhead to form the portion of the first test pattern, identifying a difference between the first reflectance measurement for the one printhead and a predetermined optical density for a predetermined area coverage percentage of a color of ink ejected by the one printhead, adjusting a first portion and a second portion of the electrical signal for the one printhead with reference to the identified difference in response to the identified difference exceeding a predetermined range about the predetermined optical density, and storing the adjusted electrical signal for the one printhead in a memory as a firing signal for the one printhead.

In another embodiment, an imaging device has been developed that enables in situ calibration of multiple printheads. The imaging device includes a media transport configured to move an image receiving member through a print zone in a process direction, a plurality of heated printheads arranged in the print zone to enable printing with a single color of phase change ink across the image receiving member in a cross-process direction, a first optical sensor located in the process direction from the plurality of heated printheads in the print zone, the first optical sensor being configured to generate signals corresponding to light reflected from ink drops ejected onto the image receiving member by the plurality of heated printheads, a spreader roller located in the process direction from the print zone, the spreader roller being configured to engage the image receiving member to spread ink drops ejected onto the image receiving member, a second optical sensor located in the process direction from the spreader roller, the second optical sensor being configured to generate signals corresponding to light reflected from spread ink drops on the image receiving member, and a controller operatively connected to the plurality of heated printheads, the first optical sensor, and the second optical sensor, the controller being configured to: operate one heated printhead in a plurality of heated printheads in the imaging device with one electrical signal in a plurality of electrical signals to eject ink drops onto the image receiving member to enable the one heated printhead in the plurality of heated printheads to produce a portion of a test pattern having a predetermined area coverage percentage on the image receiving member, identify an optical density measurement for the one heated printhead with reference to the portion of the test pattern produced by the one heated printhead and the signals generated by the second optical sensor, identify a difference between the optical density measurement for the one heated printhead and a predetermined optical density for the predetermined area coverage percentage of the test pattern and a color of ink ejected by the one heated printhead, and adjust the one electrical signal for the one heated printhead with reference to the identified difference in response to the identified difference exceeding a predetermined range about the predetermined optical density.

BRIEF DESCRIPTION OF THE DRAWINGS

The foregoing aspects and other features of a printer, which is configured to calibrate printheads for uniform color imaging between ejectors in each printhead and between multiple printheads in the printer, are described in connection with the accompanying drawings.

DETAILED DESCRIPTION

Figure 1:
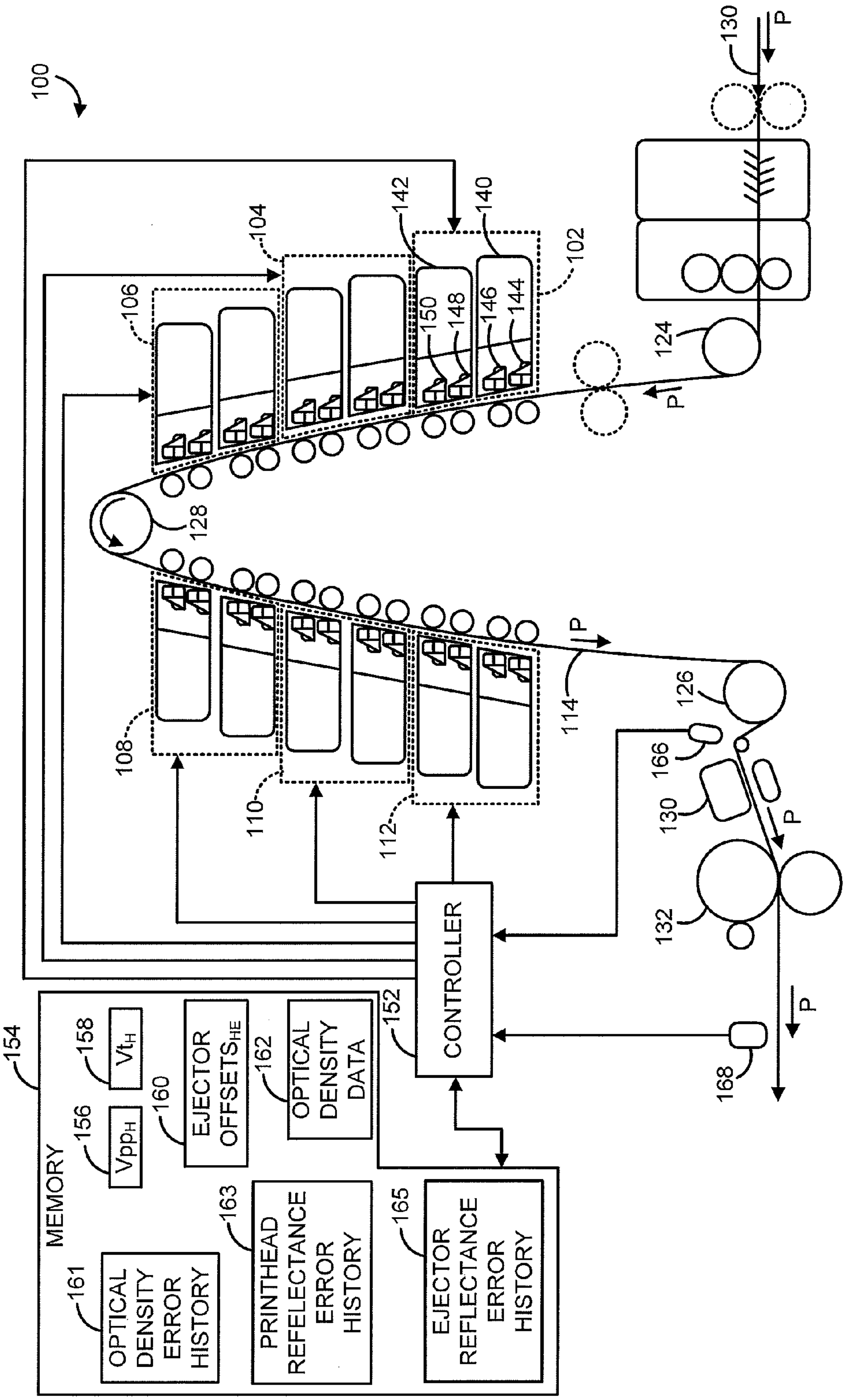
FIG. 1 is a schematic diagram of a printing system, which is configured to calibrate ink ejectors in multiple printheads for printing images with uniform optical density.

For a general understanding of the environment for the system and method disclosed herein as well as the details for the system and method, reference is made to the drawings. In the drawings, like reference numerals have been used throughout to designate like elements. As used herein, the term “imaging device” refers to any printer, copier, multifunction device, or the like that is configured to form ink images on an image receiving member. As used herein, the term “image receiving member” refers to a print medium, such as paper, or may be an intermediate imaging member, such as a print drum or endless belt, which holds ink images formed by inkjet printheads. As used herein, the term “process direction” refers to a direction in which an image receiving member moves relative to one or more printheads during an imaging operation. The term “cross-process direction” refers to a direction that is perpendicular to the process direction along the surface of the image receiving member.

When one or more printheads eject ink drops onto the image receiving member, a percentage of the image receiving member area receiving the ink is covered by ink while the remaining portion of the area is free of ink. The term “coverage area percentage” refers to the percentage of a given area of the image receiving member that is covered in ink, with 100% meaning the area is fully covered in ink and 0% meaning the area is free of ink. When forming an image with a coverage area percentage of less than 100%, a printing system dithers the ink drops to form an image with the predetermined coverage area percentage. As used herein, the term “dither” refers to an operation for ejecting ink drops in a pattern that interleaves with blank portions of the receiving member. A common example of a dithered pattern is a “checkerboard” pattern where ink drops are placed on the image surface as alternating pixels that are interleaved with blank areas. Various dither patterns can be used to generate images with different coverage area percentages.

The term “optical density” refers to a measurement of light reflected from the image receiving member and ink formed on the image receiving member. The spectrum of the light at various wavelengths is used to identify the perceived color of ink on a portion of the image receiving member. A predetermined optical density is a predetermined reflected light intensity associated with a particular wavelength of light and, hence, a particular color and coverage area percentage. For example, a patch of cyan ink with a coverage area percentage of 50% has a different predetermined optical density than another patch of cyan ink with a coverage area percentage of 100%. As described below, printheads are calibrated to eject ink drops having an appropriate size to generate the predetermined optical densities for various coverage area percentages during operation.

The term “reflectance” refers to a proportion of light reflected from a surface of an object in response to shining light on the surface. In one example, the surface of a white image receiving member has a higher reflectance value than a portion of the image receiving member that is covered in black ink. Changes in the coverage area percentage also affect the reflectance value, with the reflectance value decreasing as the coverage area percentage increases in embodiments where the image receiving member has a higher reflectance value than the ink. The reflectance value increases as the coverage area percentage increases in embodiments where the ink has a higher reflectance value than the underlying image receiving member.

As used herein, the term "test pattern" refers to an ink image formed by a predetermined arrangement of ink drops on an image receiving member that enables one or more optical sensors to detect light reflected from the test pattern for the purposes of printhead calibration. One example of a test pattern is a rectangular area formed by operating each inkjet in a single printhead to eject a predetermined number of ink drops onto an image receiving member. Various other test patterns include dashes and geometric patterns formed by one or more inkjets on the image receiving member.

As used herein, the term "printhead" refers to a group of inkjet ejectors arranged in fixed physical relationship to one another. The term "print bar" as used in this document refers to a linear arrangement of printheads that are configured for linearly movement as a group. The printhead group collectively referred to as a print bar is operatively connected to an actuator to enable the movement of the entire group in the cross-process direction. Some or all of the printheads in a print bar may be operatively connected to actuators that enable the printheads to move in a cross-process direction independently with respect to the other printheads in the print bar. In a staggered print bar arrangement, printheads are arranged in two groups or print bars that are positioned relative to one another in a staggered pattern. The staggered configuration enables the printheads on the two print bars to emit ink drops in a continuous line across an image receiving member in the cross-process direction. Two or more print bars with printheads in the staggered arrangement are referred to as a "print bar array."

Some printing systems include print bar arrays with printheads that are configured to emit drops of a single color of ink. In one embodiment described below, a first print bar array enables ink printing at a resolution of 300 dots per linear inch (DPI) in the cross-process direction while a second print bar array has an offset with respect to the inkjet ejectors of the first print bar that is one half of the distance between inkjet ejectors and also prints at 300 DPI in the cross-process direction. In combination, the two print bar arrays print pixels with a resolution of 600 DPI in the cross-process direction.

Any arrangement of printheads that is configured to print ink having a single color across the width of the image receiving member may be referred to as a "color station." A color station may include one or more sets of printheads arranged on print bars as described above. Multi-color printers may arrange a plurality of color stations along a portion of a media path known as a "print zone." As an image receiving member passes through the print zone, ink drops from different color stations form images on the print medium.

FIG. 1 depicts a continuous web printer system 100 that includes six print modules 102, 104, 106, 108, 110, and 112; a media path P configured to accept a print medium 114, a controller 152, a memory 154, image on web array (IOWA) sensor 166, and inline spectrophotometer (ILS) 168. The printing system 100 is configured to transport the print medium 114 along the media path P using various rollers including rollers 124, 126, and 128. The print modules 102, 104, 106, 108, 110, and 112 are positioned sequentially along a media path P and form a print zone for forming images on a print medium 114 as the print medium 114 travels past the print modules. A heater 130 and a spreader 132 are located at the opposite end 136 of the media path P after the print medium exits the print zone.

In printing system 100, each print module 102, 104, 106, 108, 110, and 112 in this embodiment provides an ink of a different color. In the example of FIG. 1, print modules 102, 104, 106, and 108 are configured to emit ink drops having cyan, magenta, yellow, and black colors, respectively. The print modules 110 and 112 are configured to emit ink drops of various colors referred to as "spot colors" that can be used for specific print jobs. Alternative printing systems are configured with more or fewer print modules for printing processes having various colors, including monochromatic printing. Except for ejecting ink drops having different colors, print modules 102, 104, 106, 108, 110, and 112 are substantially identical. By way of example, print module 102 includes two print sub modules 140 and 142. Print sub module 140 includes two print units 144 and 146. The print units 144 and 146 each include an array of printheads that may be arranged in a staggered configuration across the width of both the first section of web media and second section of web media. In a typical embodiment, print unit 144 has four printheads and print unit 146 has three printheads. The printheads in print units 144 and 146 are positioned in a staggered arrangement to enable the printheads in both units to emit ink drops in a continuous line across the width of media path P at a predetermined resolution. Print module 102 also includes sub module 142 that includes print units 148 and 150 in the same configuration as sub module 140, but has a cross-process alignment that differs from sub module 140 by one-half of a pixel. This enables printing system 100 to print with twice the resolution as provided by a single print sub module. In the example of FIG. 1, sub modules 140 and 142 enable the printing system 100 to emit ink drops with a resolution of 600 dots per inch.

Controller 152 is configured to control various subsystems, components and functions of printing system 100. The controller 152 may be implemented with general or specialized programmable processors that execute programmed instructions. Controller 152 is operatively connected to memory 154 to enable the controller 152 to read instructions and read and write data required to perform the programmed functions in memory 154. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits.

Controller 152 is operatively coupled to the print modules 102-112 and controls the timing of ink drop ejection from the print modules 102-112 onto the media web 114. Controller 152 is further operatively coupled to the IOWA sensor 166 prior to the media web 114 reaching the spreader roll 132, and to the ILS 168 after the media web passes through the spreader 132. The spreader roll 132 applies a combination of heat and pressure to the ink drops on the media web 114. The ink drops flatten and spread on the media web 114 to form finished ink images. During the spreading process, ink drops that are located in close proximity to one another on the media web 114 may merge together forming a continuous area of ink on the media web 114.

The IOWA sensor 166 is a full width image sensor, which monitors the ink on the web 114 as the web 114 passes under the IOWA sensor 166. In the embodiment of FIG. 1, IOWA sensor 166 extends across a width of the print medium 114 in the cross-process direction. IOWA sensor 166 is configured to measure a reflectance value for light reflected from pixel locations across the surface of web 114 and generate signals corresponding to the reflectance values. The IOWA sensor 166 includes a plurality of photodetectors that are configured to detect light reflected from pixels on the print medium 114 corresponding to a single ink ejector in each of the print modules 102-112. In one embodiment where the media web 114 is white paper and the print modules 102-112 emit inks having various colors, light reflects from ink on the media web 114 at a lower level than light reflected from bare portions of the media web 114. The IOWA sensor 166 is operatively connected to the controller 152. In the embodiment of FIG. 1, the controller 152 identifies reflectance values corresponding to one or more ink ejectors using the signals generated by the IOWA sensor 166.

The ILS 168 is positioned after the spreader in most embodiments because the spread ink drops better indicate the optical density of the color presented by the ink on the media to the human eye. The ILS 168 is also configured to measure reflected light intensity for different colors over at least the visible spectrum of light reflected from the surface of the media web 114. The ILS detects levels of reflected light corresponding to various wavelengths and is configured to generate an intensity measurement for each color of light reflected from the media web 114. In particular, when ink having a single color is ejected onto the media web 114, the ILS generates signals that correspond to the intensity of light reflected from the colored ink on the media web. The intensity of the reflected light measured by the ILS from the light reflected from a predetermined area on the surface of the media web 114 is compared by the controller 152 to a predetermined optical density for the color of the ink ejected in the predetermined area of the media web 114 to determine whether the color produced by the ink for a particular coverage percentage corresponds to the predetermined optical density.

Figure 5:
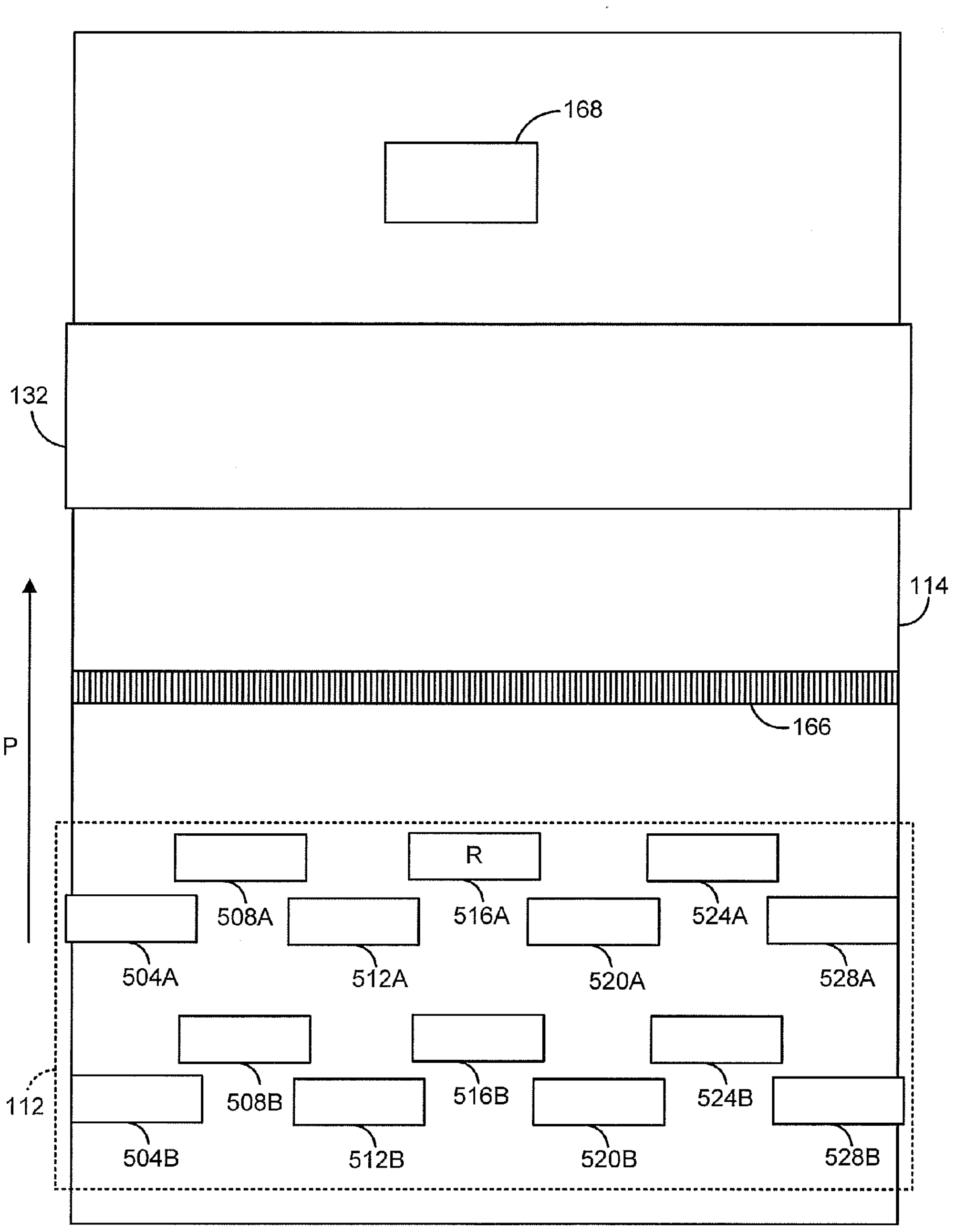
FIG. 5 is a schematic view of a portion of the printing system of FIG. 1.

FIG. 5 depicts the configuration of print module 112, IOWA sensor 166, spreader roller 132, and ILS sensor 168 of the printing system 100 in more detail. Print module 112 includes two sets of staggered printheads 504A-528A and 504B-528B. Each of the printheads includes a plurality of ink ejectors that are configured to eject ink drops onto the media web 114 as the media web moves in the process direction P. The other print modules 102-110 have substantially the same configuration. The IOWA sensor 166 is positioned after the print module 112 in the process direction P extends across the media web 114 in the cross-process direction. The IOWA sensor includes a plurality of photodetectors that are configured to detect reflectance values corresponding to individual inkjets in each of the printheads 504A-528A and 504B-528B. The ILS 168 is positioned after the spreader roller 132. The ILS is configured to measure the optical density of test patterns and ink images formed on the media web 114 by a single reference printhead in each print module, exemplified by printhead 516A in FIG. 5. The ILS in some embodiments is large enough to measure optical density of an entire test pattern or ink image produced by a single printhead and in other embodiments the ILS samples only a portion of a test pattern or ink image produced by a single printhead.

Figure 4:
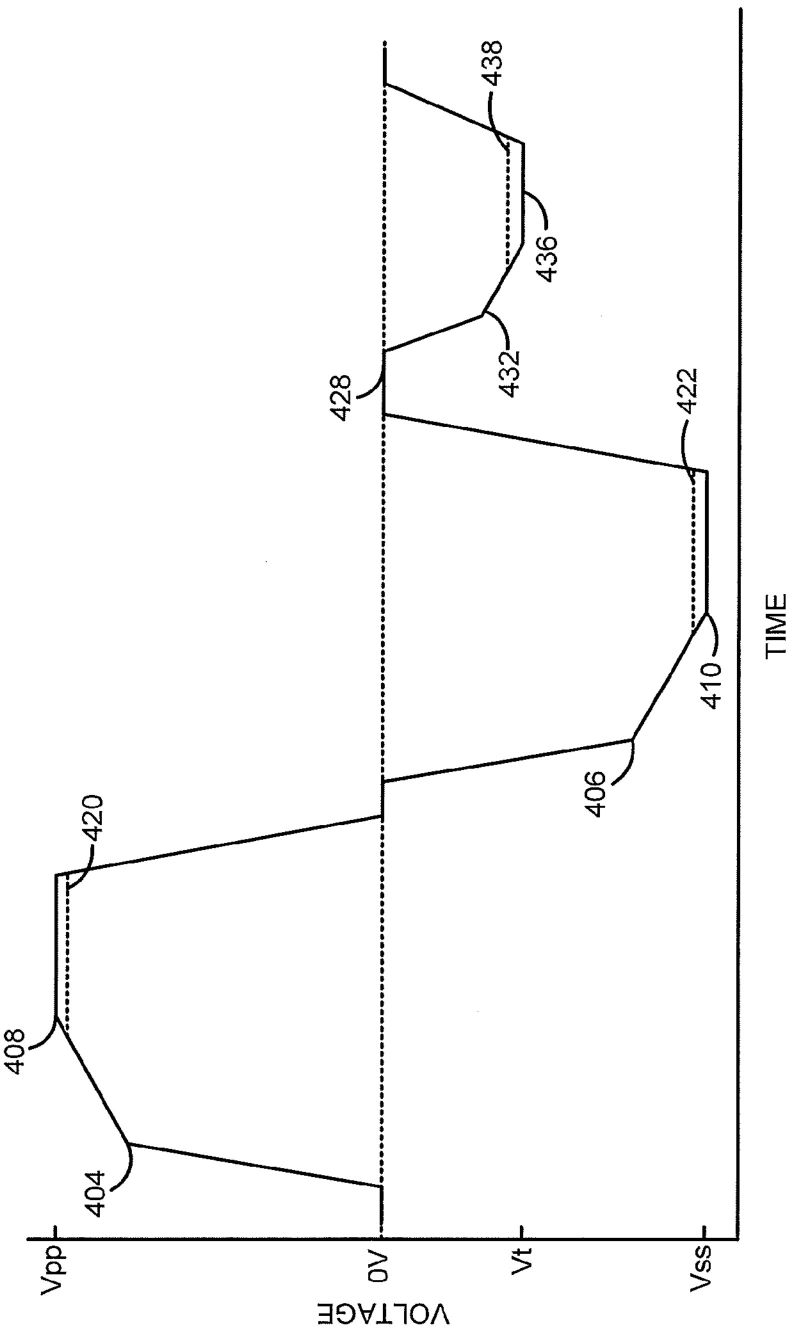
FIG. 4 is a diagram of an exemplary electrical signal that is used to operate an ejector to eject an ink drop.

In operation, the controller 152 generates a plurality of electrical signals, also referred to as firing signals, which operate inkjets in one or more of the print units 102-112. Each generated firing signal operates an actuator in a single inkjet ejector to eject an ink drop onto the image receiving member. In some embodiments, one or more electrical amplifiers (not shown) amplify the electrical signal generated by the controller 152 to a power level that is appropriate for operating the ink ejectors. FIG. 4 depicts a waveform for the electrical signals that the controller 152 generates to operate the inkjets. The voltage of the signal increases at a first rate to a first inflection voltage 404, and then increases as a lower rate to a peak voltage $V_{pp}$ 408. The firing signal remains at the peak voltage for a predetermined time period before changing to a negative voltage with a negative voltage inflection voltage 406, and a negative peak voltage 410. In FIG. 4, the waveform for the peak voltage $V_{pp}$ and negative peak voltage $V_{ss}$ have substantially identical magnitudes and waveform shapes with different polarities. The change in voltage between $V_{pp}$ and $V_{ss}$ is referred to as a "peak-to-peak" portion of the electrical signal. After generating the $V_{ss}$ voltage for the predetermined time period, the waveform returns to zero voltage 428 and then drops a second time to an inflection point 432 and tail voltage $V_t$ 436. The magnitude of the tail voltage is less than the magnitude of the peak voltages $V_{pp}$ and $V_{ss}$ and the polarity of the tail voltage may be either positive or negative. In an exemplary embodiment, the magnitudes for $V_{pp}$ and $V_{ss}$ are in a range of approximately 30 to 50 volts and the magnitude of $V_t$ is between approximately 10 and 20 volts, although alternative ink ejector configurations operate with various voltage levels.

In the printing system 100, the values of $V_{pp}$, $V_{ss}$, and $V_t$ are configurable on a per-printhead basis. Thus, the firing signals generated for each inkjet ejector in a single printhead share a single $V_{pp}$, $V_{ss}$, and $V_t$ value. As described below, the printing system 100 calibrates different printheads with various values of $V_{pp}$, $V_{ss}$, and $V_t$ to enable the printheads to form ink patterns with uniform optical densities. Within each printhead, individual inkjets may emit ink drops having different masses that result in variations in the optical density of ink emitted from a single printhead. The controller 152 is further configured to adjust the relative values of $V_{pp}$, $V_{ss}$, and $V_t$ for one or more of the individual inkjets in each printhead. The controller 152 selects a relative reduction in the value of $V_{pp}$ from the predetermined value of $V_{pp}$ and $V_{ss}$ selected for the printhead. In the printing system 100, the magnitude of the reduction can range from zero volts up to a value corresponding to the voltage difference between $V_{pp}$ 408 and the inflection voltage value 404. The same relative reduction is applied to the $V_{ss}$ portion of the waveform. The controller 152 is configured to apply another relative reduction in magnitude to $V_t$ with the magnitude of the voltage reduction ranging from zero volts up to a value corresponding to the voltage difference between $V_t$ 436 and the tail inflection voltage 432.

In the printing system 100, the relative adjustment to the voltages in firing signals for individual inkjets always reduces the magnitude of a firing signal from the values of $V_{pp}$, $V_{ss}$, and $V_t$ for the printhead. Thus, $V_{pp}$, $V_{ss}$, and $V_t$ selected for a printhead are the maximum voltage magnitudes for firing signals that operate inkjets, and individual ink ejectors within the printhead may operate with voltages having smaller magnitudes. As seen in FIG. 4, voltages 420 and 422 represent an adjusted peak voltage amplitude for a single ejector in a printhead. Similarly, the tail voltage value $V_t$ represents a maximum magnitude of the tail voltage 436, and individual inkjets may be configured to operate with a smaller magnitude tail voltage, such as tail voltage 438.

Figure 2A:
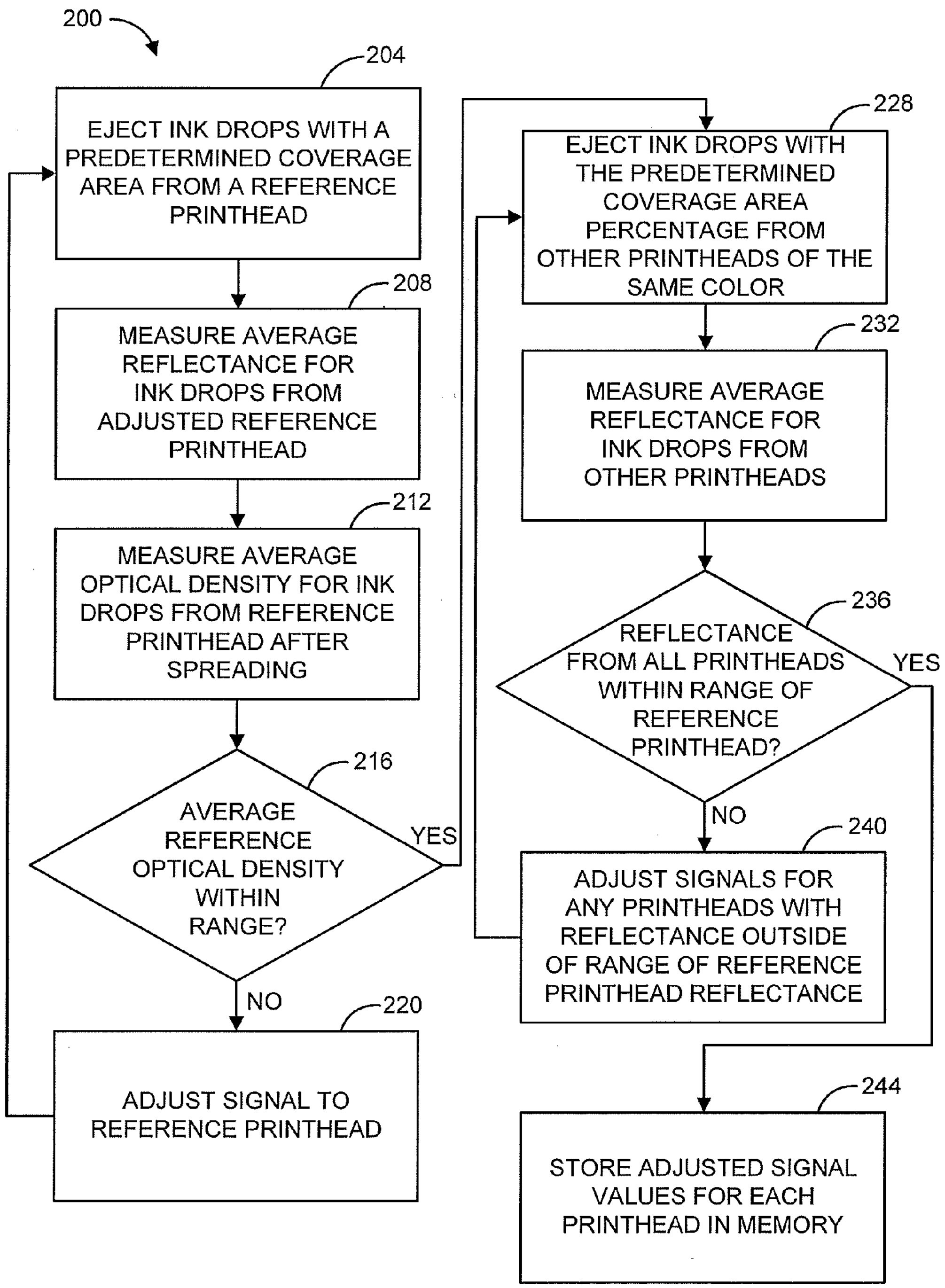
FIG. 2A is a block diagram of a process for calibrating multiple printheads to eject ink drops with uniform optical density.

FIG. 2A depicts an iterative process 200 for calibrating the electrical signals used to operate multiple printheads that are configured to eject ink drops of a single color of ink. The printing system 100 is configured to perform process 200 for each of the print modules 102-112 and is referenced by way of example. Process 200 begins by ejecting ink drops with a predetermined coverage area percentage from a single reference printhead that is configured to eject ink having a selected color (block 204). The reference printhead ejects ink drops to form a test pattern that is suitable for use with the IOWA 166 and with the ILS 168.

Process 200 selects test patterns that have either a high coverage area percentage or low coverage area percentage. The high coverage area percentage is typically above 90% ink coverage, with one configuration of system 100 using a value of 100% ink coverage. In system 100, the high coverage area percentage test patterns are used to calibrate the tail voltage $V_t$ for each printhead. The low coverage area percentage is typically less than 35% ink coverage, with one configuration of the system 100 using a value of 25% ink coverage. In system 100, the low coverage area percentage test patterns are used to calibrate the peak voltages $V_{pp}$ and $V_{ss}$.

Once the test pattern is printed on the image receiving member, process 200 measures the average reflectance of ink drops in the test pattern from the reference printhead (block 208). In system 100, the IOWA sensor 166 is configured to measure the reflectance of the ink drops prior spreading the ink drops. The IOWA sensor 166 is configured measure the reflectance of ink drops from each ejector individually. The controller 152 averages the reflectance values of ink drops corresponding to the inkjets in reference printhead to generate average reflectance measurement for the test pattern formed by the reference printhead. In an alternative embodiment, the IOWA sensor 166 or an equivalent sensor is configured to detect the reflectivity of ink drops after the ink drops are spread on the image receiving member.

Process 200 continues by measuring the average optical density of ink ejected from a single reference printhead after the test patterns are spread on the image receiving member (block 212). In system 100, the ILS 168 is positioned in the process direction P after the spreader 132. The spreader 132 flattens the individual ink drops from the reference printhead and produces a color test pattern with reduced image noise due to variations in the drop size and drop placement of individual ejectors in the printhead. The ILS 168 measures the average optical density of the light reflected by the spread ink formed in a test pattern at particular wavelength for the color of ink ejected by the single printhead.

After measurement of the optical density of the test pattern generated by the reference printhead, process 200 compares the measured optical density to a predetermined optical density (block 216). The predetermined optical density corresponds to an expected reflectance measurement for the particular wavelength and the coverage area percentage for the ink ejected to print the test pattern. For example, a coverage area percentage of 100% of magenta ink has one predetermined optical density, while a coverage area percentage of 25% has a different predetermined optical density. In the system 100, the memory 154 holds a plurality of predetermined optical density values 162 that correspond to different ink colors and different coverage area percentages. The controller 152 compares the measured optical density to the predetermined optical density corresponding to the ink color and the coverage area percentage.

If the value of the measured optical density falls outside of a predetermined range of optical density values with respect to the predetermined optical density, then process 200 adjusts the electrical signal supplied to the inkjets in the reference printhead (block 220). The portion of the electrical signal that is adjusted is selected based on the coverage area percentage of the test pattern. The values of $V_{pp}$ and $V_{ss}$ are adjusted when measuring the optical density of the low coverage area percentage test pattern, and the value of $V_t$ is adjusted when measuring the optical density of the high coverage area percentage test pattern. System 100 implements a proportional-integral (PI) control system to select a new electrical signal voltage based on the measured difference between the optical density of the test pattern and the predetermined optical density, as well as an accumulated optical density error measured in one or more previous iterations of the process 200. The memory 154 stores an error history 161 that contains a value corresponding to one or more previously detected optical density errors corresponding to the ink color and coverage area percentage for the reference printhead.

Process 200 operates the printing system as described in blocks 204-220 in an iterative manner until the measured optical density of the reference printhead is within the predetermined range of the predetermined optical density (block 216). Process 200 then operates each of the other printheads in the print module that contains the reference printhead to form the same test pattern with the same predetermined coverage area percentage that was formed by the reference printhead (block 228). The printing system 100 measures the average reflectance for the portions of the test pattern formed by each printhead using the IOWA 166 (block 232).

Process 200 compares the average reflectance value measured for each printhead that generated the test patterns in block 228 to the average reflectance value measured for the reference printhead (block 236). Process 200 adjusts a portion of the electrical signal for any printhead having a reflectance value that falls outside of a predetermined range about the reflectance of the reference printhead (block 240). For example, if the reference printhead has a measured reflectance value of 60% with a ±5% tolerance range, then one of the other printheads in the print module with a reflectance value of 70% is considered outside of the reflectance range of the reference printhead.

The portion of the firing signal that is adjusted for printheads having reflectance values outside of the range of the reference printhead is selected based on the coverage area percentage of the test pattern. In the example of printing system 100, if the test pattern has a low image area coverage percentage, then $V_{pp}$ and $V_{ss}$ are adjusted, and if the test pattern has a high image area coverage percentage then $V_t$ is adjusted. System 100 implements a PI control system to adjust the electrical signals for each printhead based on the magnitude of difference between the reflectance value of each printhead and the reflectance value of the reference printhead, as well as accumulated error values identified in previous iterations of process 200. The memory 154 contains a reflectance error history 163 that stores previously measured errors in the reflectance of each printhead that are used for adjusting the electrical signals for each printhead.

Process 200 iterates blocks 228-240 until the adjusted firing signals for each printhead generate a portion of the test pattern with a reflectance value that is within the predetermined range of the reference printhead (block 236). Process 200 stores the adjusted firing signal values for each printhead in the module, including the reference printhead and the non-reference printheads, in the memory 144 for use during imaging operations (block 244). In printing system 100, the $V_{ss}$ value has the same magnitude as $V_{pp}$, and the controller 152 is configured to generate waveforms similar to the waveform depicted in FIG. 4 using the stored $V_{pp}$ values 156 and $V_t$ values 158.

If the reflectance value for any printhead falls outside the predetermined range, then the electrical signals corresponding to each printhead outside of the range are adjusted (block 240). As with the reference printhead, the portion of the electrical signal that is adjusted for each printhead is selected based on the coverage area percentage of the test patterns. The values of $V_{pp}$ and $V_{ss}$ are adjusted when measuring the optical density of the low coverage area percentage test pattern, and the value of $V_t$ is adjusted when measuring the optical density of the high coverage area percentage test pattern.

Process 200 is an iterative process. If either or both of the average optical density of the reference printhead or the average reflectance values for any of the printheads fall outside of predetermined ranges, process 200 returns to block 204 by printing test patterns using the adjusted electrical firing signals. Process 200 completes when both the average optical density of the reference printhead (block 216) and the average reflectance value of all the printheads (block 236) are within their respective predetermined ranges. Process 200 then stores the adjusted $V_{pp}$ and $V_t$ values corresponding to each printhead in memory for use in imaging operations. In system 100, the controller 152 stores a $V_{pp}$ value 156 and $V_t$ value 158 in the memory 154 for each of the H printheads in the system 100.

Figure 2B:
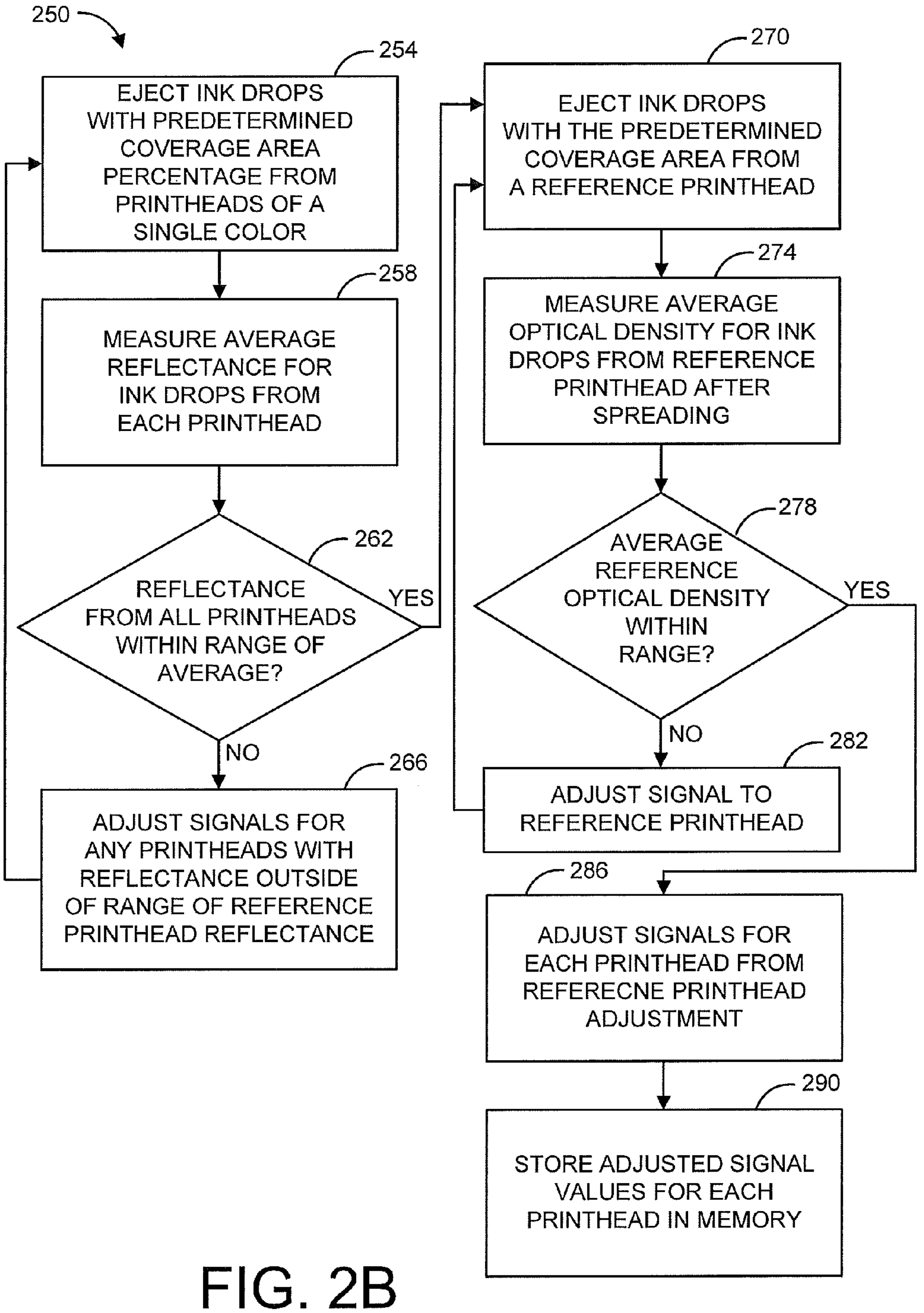
FIG. 2B is a block diagram of another process for calibrating multiple printheads to eject ink drops with uniform optical density.

FIG. 2B depicts an alternative iterative process 250 for calibrating the electrical signals used to operate multiple printheads that are configured to eject ink drops of a single color of ink. The controller 152 in the printing system 100 is configurable to perform either one or both of processes 200 and 250 for each of the print modules 102-112 and is referenced by way of example. Process 250 begins by ejecting ink drops with a predetermined coverage area percentage from each of the printheads in a single print module corresponding to a single color of ink (block 254). Each printhead ejects ink drops to form a test pattern that is suitable for use with the IOWA 166. The reference printhead in each print module also ejects ink drops that form a test pattern suitable for use with the ILS 168.

In printing system 100, the IOWA 166 identifies an average reflectance value corresponding to the ink drops that are ejected by each of the printheads (block 258). The controller 152 identifies an average reflectance value for all of the printheads in the print module, and compares the reflectance value measured for each printhead to the average (block 262). The controller 152 adjusts the firing signals supplied to any printheads having average reflectance values that fall outside of a predetermined range (block 266).

The portion of the firing signal that is adjusted for printheads having reflectance values outside of the range of the average reflectance value for the print module is selected based on the coverage area percentage of the test pattern. In the example of printing system 100, if the test pattern has a low image area coverage percentage, then $V_{pp}$ and $V_{ss}$ are adjusted, and if the test pattern has a high image area coverage percentage then $V_t$ is adjusted. System 100 implements a PI control system to adjust the electrical signals for each printhead based on the magnitude of difference between the reflectance value of each printhead and the average reflectance value of the print module, as well as accumulated error values identified in previous iterations of process 200. The memory 154 contains a reflectance error history 163 that stores previously measured errors in the reflectance of each printhead that are used for adjusting the electrical signals for each printhead.

The printing system 100 performs process blocks 254-266 iteratively until the average reflectance value of each printhead is within the predetermined range of the average reflectance value for the entire print module (block 262). Process 250 continues by operating a single reference printhead to eject ink drops with the same test pattern having the predetermined coverage area percentage (block 270). The ILS 168 measures the optical density of the ink drops from the reference printhead (block 274), and the controller 152 compares the measured optical density to a predetermined optical density that is stored in the optical density data 162 in the memory 154 (block 278). If the measured optical density of the test pattern generated by the reference printhead is outside of a predetermined range of the predetermined optical density, a portion of the firing signal for the reference printhead is adjusted (block 282). Process blocks 270, 274, 278, and 282 of process 250 are performed in substantially the same manner as process blocks 204, 212, 216, and 220, respectively, of process 200.

Once the firing signal for the reference printhead is adjusted, process 250 performs a corresponding adjustment to the firing signals for each of the other printheads in the print module (block 286). For example, if the printing system 100 generates a high coverage percentage test pattern, then the value of $V_t$ for the reference printhead is adjusted in process blocks 270-282. The corresponding adjustment value for $V_t$ that is applied to the firing signal for the reference printhead is also applied to the $V_t$ portion of the firing signals for the other printheads in the print module. In one example, performing the processing described in blocks 270-282 results in the controller 152 increasing the $V_t$ value of the firing signal for the reference printhead by one volt to enable the reference printhead to generate a test pattern that causes the ILS to produce an optical density measurement for the test pattern color that is within the predetermined range about the predetermined optical density. In this example, the controller 152 also increases the $V_t$ values for each of the other printheads by one volt. The absolute $V_t$ voltages for each printhead may still be different, but the same relative adjustment is applied to each firing signal. The controller 152 is configured to store the adjusted firing signal values for each of the printheads in the memory 154 (block 290).

Either or both of processes 200 and 250 are performed for both high and low coverage area parameters and for each of the print modules to generate calibrated $V_{pp}$ and $V_t$ values for each printhead in the printer. In one configuration, each iteration of process 200 or 250 alternates between a high coverage area percentage test pattern and a low coverage area percentage test pattern to enable the processes 200 and 250 to generate electrical signals that produce uniform optical densities for both high and low coverage area patterns. During operation, the calibration processes 200 and 250 are repeated when one or more printheads or print sub-modules are replaced. Additionally, one or more print modules may be calibrated periodically to account for changes in the performance of different printheads that occur during printing operations.

Figure 3:
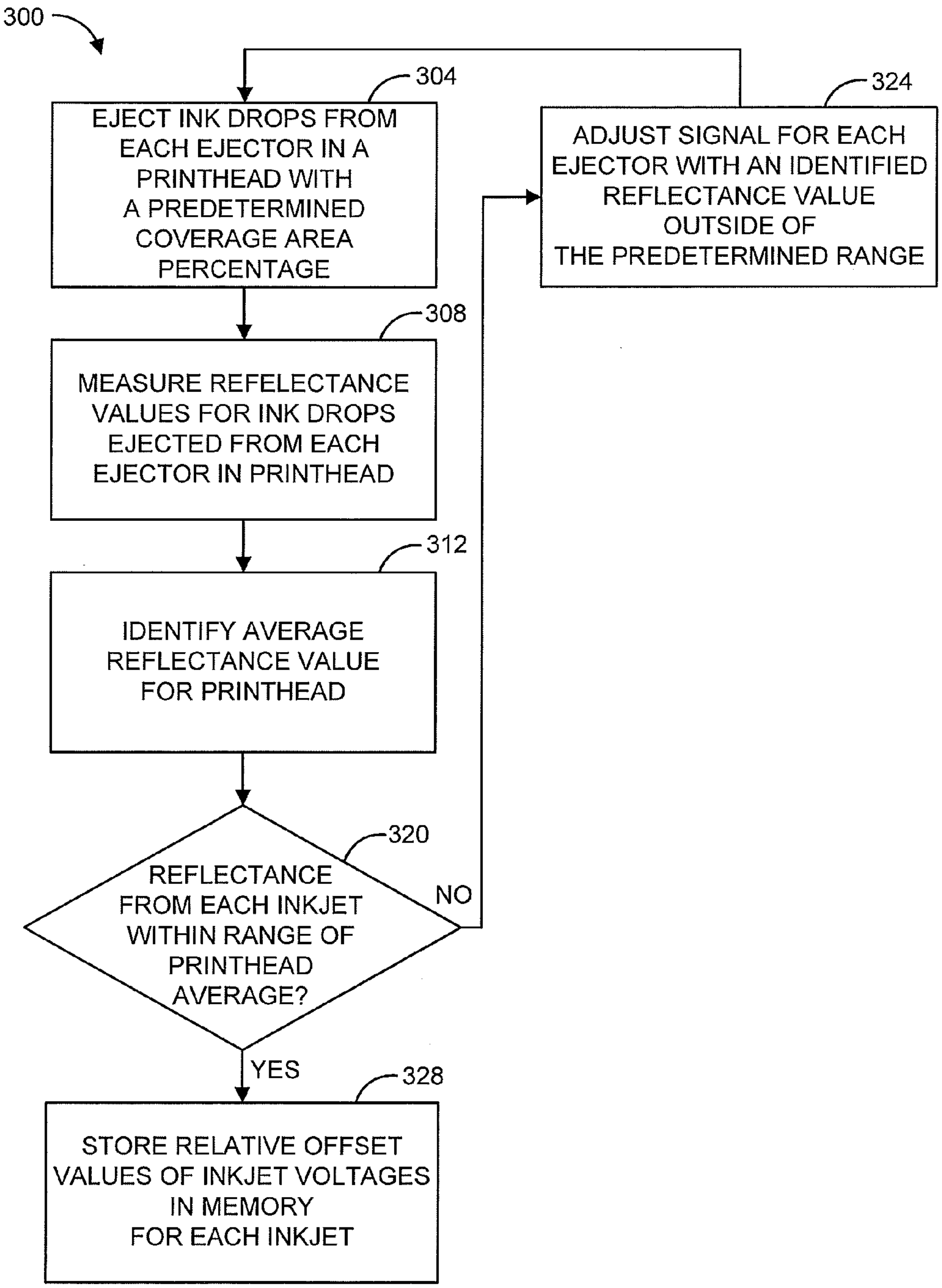
FIG. 3 is a block diagram of a process for calibrating ejectors in a single printhead to print with a uniform optical density.

In addition to calibration of multiple printheads, the inkjets in a single printhead can also be calibrated so that the ejectors emit ink drops having masses within a predetermined range of the average value for the entire printhead. FIG. 3 depicts an iterative process 300 for calibration of individual ejectors within a printhead based on the measured reflectance values for ink drops emitted by inkjets in the printhead. Process 300 is performed at least once for each printhead in a printing system, and can be performed periodically to maintain the calibration of individual inkjets in each printhead. In one configuration, process 300 is performed after the average reflectance value of test patterns formed by the printhead is calibrated using a multi-printhead calibration process such as process 200. In another configuration, process 300 is performed concurrently with another calibration process to enable uniform ink drop mass ejection from individual inkjets in a single printhead while the average ink drop mass for the printhead is calibrated. The printing system 100 is configured to perform process 300 for each printhead in the print modules 102-112, and is referenced by way of example.

Process 300 begins by ejecting ink drops from each ejector in a printhead to form a test pattern having a predetermined coverage area percentage on the image receiving member (block 304). In one embodiment, the test pattern is either a high coverage area percentage test pattern in the range of 90% to 100% coverage, or a low coverage area percentage test pattern with less than 35% coverage. In printing system 100, the controller 152 generates electrical signals to operate each ejector in a single printhead to form the high and low coverage area test patterns. In some configurations, the test patterns formed during process 200 may also be used in process 300. When generating the test pattern, some or all of the ejectors in the printhead operate with effective $V_{pp}$ or $V_t$ values that are reduced from the nominal $V_{pp}$ and $V_t$ values used for the printhead. FIG. 4 depicts the reduced magnitude signals 420 and 438 corresponding to nominal $V_{pp}$ value 408 and $V_t$ value 410, respectively. In system 100, the memory 154 stores the relative voltage adjustment data for each ejector in a lookup table 160. The relative voltage adjustment data includes a relative offset for one or both of the $V_{pp}$ and $V_t$ values assigned to each ejector E in each of the printheads H.

Once the test pattern is formed on the image receiving member, process 300 measures reflectance values for ink drops ejected from each inkjet in the printhead (block 308). In a typical embodiment, each ejector emits multiple ink drops in the process direction and the measured reflectance value for each inkjet is an average of the reflectance of the ink drops. In system 100, the IOWA sensor 166 is configured to detect reflectance values that correspond to ink drops ejected from each of the inkjets in the printhead. Process 300 identifies an average reflectance value for the printhead by generating an average reflectance value from each of the reflectance values measured for each ejector (block 312).

Process 300 continues by comparing the reflectance value measured for each inkjet to the average reflectance value for the printhead, and identifying inkjets with measured reflectance values falling outside of the predetermined range (block 320). For example, if the average reflectance value for a printhead is 50% with a range of ±5%, then an ejector with a measured reflectance value of 40% falls outside of the predetermined range.

Process 300 adjusts the electrical signals that are used to operate each ejector that is identified to have a reflectance value falling outside of the predetermined range of the average reflectance value of the printhead (block 324). The portion of the electrical signal that is adjusted is selected with reference to the coverage area percentage of the test pattern formed in block 304. For a low coverage area percentage test pattern, process 300 adjusts the relative magnitude of $V_{pp}$ and the corresponding $V_{ss}$, and process 300 adjusts the relative magnitude of $V_t$ for a high coverage area percentage test pattern.

Process 300 performs a relative adjustment to the electrical signal used to operate each ejector. That is, the value of $V_{pp}$ and $V_t$ used to operate the entire printhead remains unchanged, but a relative adjustment that decreases the magnitude of $V_{pp}$ or $V_t$ used to operate an individual inkjet in the printhead is adjusted. The magnitude of the adjustment is made using a PI control system. In system 100, the relative voltage adjustment selected for either $V_{pp}$ or $V_t$ is an integer number that corresponds to a number of voltage levels having magnitudes between the nominal maximum magnitude of $V_{pp}$ or $V_t$, and a corresponding inflection voltage level. Referring to FIG. 4, the system 100 may have a predetermined number of increments formed between the nominal maximum $V_{pp}$ voltage 408 and the inflection voltage level 404 as exemplified by voltage 420. Another predetermined number of increments are formed between the nominal $V_t$ voltage 436 and the inflection voltage 432 as exemplified by voltage 438. The controller 152 selects the amount of adjustment to the relative offset of the $V_{pp}$ or $V_t$ voltage with reference both to the magnitude of difference between the measured reflectance value of the ejector and the average reflectance value of the printhead, and with reference to an error history of previously measured differences in reflectivity for the inkjet. In system 100, the memory 154 stores a history of reflectance errors 165 for each inkjet that are used by the controller 152, along with error identified in block 320, to implement a PI control system for adjusting the relative voltages applied to each inkjet.

Process 300 iterates when the relative voltage values for one or more ink ejectors are adjusted, returning to block 304. When all of the inkjets in the printhead are calibrated to produce ink drops with reflectance values within the predetermined range of the average reflectance (block 320), the relative voltage adjustment values for each inkjet in the printhead are stored in memory for later use (block 328). In the system 100, the memory 154 stores the relative adjustment values for both $V_{pp}$ and $V_t$ of each ejector, which are kept in a lookup table 160. During imaging operations, the controller 152 generates electrical signals used to operate each ejector with the stored modified values 160 corresponding to each inkjet.

The in situ method and system of calibration is well-suited for use in printing systems that use phase change inks. Phase change inks require heated printheads to maintain the ink in a liquid phase and the ink needs to be fixed to media with a spreader to produce the best quality image. Over the life of a heated printhead, the inkjet ejectors eject drops that have less mass than the ink drops ejected earlier in the life of the printheads. Consequently, the optical density of the colored ejected ink produced by the heated printheads changes over the life of the phase change imaging system and needs to be evaluated and adjusted in situ to ensure proper image quality. In order to provide data regarding the placement of ink drops ejected by printheads in a solid ink or phase change ink printing system, the image on web array (IOWA) optical system is positioned prior to the spreader so individual ink drops can be imaged and the positional data of the image data corresponding to the drops analyzed to evaluate inkjet ejector performance in the printheads. These image data, however, cannot effectively provide information on the optical density of the ejected colored ink because the media temperature affects the optical density obtained from the reflectance measurements generated by the IOWA system. To ensure more accurate optical density measurements, the inline spectrophotometer (ILS) is positioned after the spreader. This sensor is more immune to image noise produced by varying media temperatures. Additionally, the system and method required above require only one ILS sensor as the other printheads are calibrated to be within a predetermined range about the ink ejected by the printhead measured by the ILS sensor. Because a single ILS sensor that spans the width of the media or the inclusion of one ILS sensor for each printhead would be relatively expensive, the system and method described above provide a cost effective manner for the production of usable optical density data in a phase change ink imaging system.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An imaging device comprising:

a media transport configured to move an image receiving member through a print zone in a process direction;

a plurality of heated printheads arranged in the print zone to enable printing with a single color of phase change ink across the image receiving member in a cross-process direction;

a first optical sensor located in the process direction from the plurality of heated printheads in the print zone, the first optical sensor being configured to generate signals corresponding to light reflected from ink drops ejected onto the image receiving member by the plurality of heated printheads;

a spreader roller located in the process direction from the print zone, the spreader roller being configured to engage the image receiving member to spread ink drops ejected onto the image receiving member;

a second optical sensor located in the process direction from the spreader roller, the second optical sensor being configured to generate signals corresponding to light reflected from spread ink drops on the image receiving member; and a controller operatively connected to the plurality of heated printheads, the first optical sensor, and the second optical sensor, the controller being configured to:

operate one heated printhead in a plurality of heated printheads in the imaging device with one electrical signal in a plurality of electrical signals to eject ink drops onto the image receiving member to enable the one heated printhead in the plurality of heated printheads to produce a portion of a test pattern having a predetermined area coverage percentage on the image receiving member;

identify an optical density measurement for the one heated printhead with reference to the portion of the test pattern produced by the one heated printhead and the signals generated by the second optical sensor;

identify a difference between the optical density measurement for the one heated printhead and a predetermined optical density for the predetermined area coverage percentage of the test pattern and a color of ink ejected by the one heated printhead; and adjust the one electrical signal for the one heated printhead with reference to the identified difference in response to the identified difference exceeding a predetermined range about the predetermined optical density.

2. The imaging system of claim 1, the controller being further configured to:

identify a reflectance measurement for the one printhead with reference to the portion of the test pattern produced by the one heated printhead and the signals generated by the first optical sensor;

operate each printhead in the plurality of printheads other than the one heated printhead with the plurality of electrical signals, each electrical signal in the plurality of electrical signals operating only the one heated printhead to eject ink drops onto the image receiving member to enable each heated printhead in the plurality of heated printheads other than the one heated printhead to produce a portion of the test pattern on the image receiving member;

identify a reflectance measurement for each printhead in the plurality of heated printheads other than the one heated printhead with reference to the portion of the test pattern produced by the one heated printhead and the signals generated by the first optical sensor; and adjust each electrical signal in the plurality of electrical signals used to operate each heated printhead in the plurality of heated printheads other than the one heated printhead having an identified reflectance measurement that is outside a predetermined range about the identified reflectance measured for the one heated printhead.

3. The imaging system of claim 1, the controller being further configured to:

operate the plurality of heated printheads in the imaging device with the plurality of electrical signals, each electrical signal in the plurality of electrical signals operating only one heated printhead to eject ink drops onto the image receiving member to enable each heated printhead in the plurality of heated printheads to produce a portion of the test pattern on the image receiving member;

identify a reflectance measurement of light for each heated printhead in the plurality of heated printheads with reference to the portion of the test pattern produced by each heated printhead and the signals generated by the first optical sensor;

identify an average for the reflectance measurements;

identify a difference between each reflectance measurement and the average for the reflectance measurements;

adjust each electrical signal in the plurality of electrical signals used to operate each heated printhead in the plurality of heated printheads having an identified reflectance measurement that is outside a predetermined range about the average of the reflectance measurements; and adjust each electrical signal in the plurality of electrical signals for each heated printhead in the plurality of heated printheads other than the one heated printhead with reference to the adjusted firing signal for the one heated printhead.

4. The imaging device of claim 1, the controller being further configured to:

operate the plurality of heated printheads in the imaging device to enable each heated printhead in the plurality of heated printheads to produce a portion of the test pattern on the image receiving member;

identify a reflectance measurement of light for each inkjet in each heated printhead in the plurality of heated printheads with reference to the portion of the test pattern produced by each heated printhead and the signals generated by the first optical sensor;

identify an average for the reflectance measurements for each heated printhead from the reflectance measurements corresponding to the inkjets within each respective heated printhead;

identify a difference between each reflectance measurement for an inkjet and the average for the reflectance measurements for the heated printhead in which the inkjet is positioned; and adjust a maximum voltage for each inkjet in each respective heated printhead having a reflectance measurement that is outside a predetermined range about the average for the reflectance measurements of the inkjets in the heated printhead in which the inkjet is positioned.

5. The imaging device of claim 1, wherein the first optical sensor is an optical imaging device having an array of optical sensors that extend across a width of the image receiving member in a cross-process direction, and the second optical sensor is an inline spectrophotometer positioned to receive light from the portion of the test pattern produced by the one heated printhead.

* * * * *